United States Patent
Taylor et al.

(10) Patent No.: US 7,217,385 B2
(45) Date of Patent: May 15, 2007

(54) POLYVINYL ALCOHOL COMPOSITION AND FILM

(75) Inventors: Paul Anthony Taylor, North Somerset (GB); Kevin Mark Goninan, North Somerset (GB); Thomas Vivian Simpkins, Flitwick (GB); Michael Thomas Williams, Flitwick (GB); Anthony Cyril Soden, Tamworth (GB)

(73) Assignee: Polyval plc, London (GB)

( * ) Notice: Subject to any disclaimer, the term of this patent is extended or adjusted under 35 U.S.C. 154(b) by 126 days.

(21) Appl. No.: 11/128,683

(22) Filed: May 13, 2005

(65) Prior Publication Data

US 2005/0209362 A1    Sep. 22, 2005

Related U.S. Application Data

(63) Continuation of application No. PCT/GB03/04960, filed on Nov. 14, 2003.

(30) Foreign Application Priority Data

Nov. 15, 2002  (GB)  ................. 0226763.1

(51) Int. Cl.
  *C08J 5/18*  (2006.01)
  *C08J 3/18*  (2006.01)
  *C08K 5/00*  (2006.01)
  *C08L 28/02*  (2006.01)

(52) U.S. Cl. ........................ 264/343; 264/345; 524/803

(58) Field of Classification Search ................ 264/343, 264/345; 524/803
  See application file for complete search history.

(56) References Cited

U.S. PATENT DOCUMENTS 4,323,492 A * 4/1982 Zimmermann et al. ..... 524/388
4,469,837 A   9/1984 Cattaneo
4,656,216 A * 4/1987 Muller et al. ................ 524/381

FOREIGN PATENT DOCUMENTS

| EP | 0860471 A | 8/1998 |
|---|---|---|
| GB | 444278 | 3/1936 |
| JP | 61014916 A2 | 1/1986 |
| JP | 07018145 A2 | 1/1995 |

* cited by examiner

*Primary Examiner*—Kelechi C. Egwim
(74) *Attorney, Agent, or Firm*—Schwegman, Lundberg, Woessner and Kluth P.A.

(57) ABSTRACT

A method of preparing a plasticised particulate polyvinyl alcohol (PVA) composition is provided, comprising: mixing, in a mixer, at a mixer speed and for a time sufficient that the mixture attains a temperature of at least 50° C.: particulate PVA resin in an amount from 80% to 90% by weight of the mixture; and plasticiser in an amount from 10% to 20% by weight of the mixture, wherein at least a portion of the plasticiser is water; monitoring the apparent viscosity of the mixture during mixing and continuing mixing until the apparent viscosity of the mixture has peaked to a maximum and dropped off to a substantially constant level, thereby to obtain a plasticised particulate mixture having a moisture content in the range from 7% to 14%; preferably adding an anti-caking agent in an amount from 0.05% to 0.5% by weight of the plasticised particulate mixture, and continuing mixing until the anti-caking agent is blended to the plasticised particulate mixture; and stopping mixing, and removing the mixture from the mixer, wherein the mixture temperature is kept below 100° C. at all times during mixing. The properties of the plasticised particulate composition are such that it can be processed, by extrusion and blowing, to a film having advantageous characteristics in terms of structure and properties. Accordingly, also provided is a PVA film characterised in that, when viewed using polarising light microscopy, it has a nonuniform texture consisting of distinct short range areas, e.g. 10 to 500 micrometers, each short range area showing anisotropic orientation within its area, each short range area being oriented isotropically.

22 Claims, No Drawings

POLYVINYL ALCOHOL COMPOSITION AND FILM

RELATED APPLICATIONS

This application is a continuation under 35 U.S.C. 111(a) of PCT/GB2003/004960, filed Nov. 14, 2003 and published as WO 2004/046229 A1, filed Jun. 3, 2004, which claimed priority under 35 U.S.C. 119 to United Kingdom Application No. 0226763.1, filed Nov. 15, 2002, which applications hereof.

This invention relates to plasticised particulate polyvinyl alcohol (PVA) compositions suitable for forming extruded blown films which are biodegradable and, hence, environmentally friendly alternatives to films formed from polyethylene and other synthetic resins.

Transparent polyethylene films have long been known and used as packaging material, for example as carrier or refuse bags. Typically, these films have a minimum thickness of about 10 µm, in order to provide the necessary strength and integrity for practical use. However, a major drawback of these films is that they are generally not biodegradable.

On the other hand, paper is known as a biodegradable packaging material. However, paper generally is opaque and, therefore, for many applications, is not suitable. In addition, uncoated paper rapidly loses strength or integrity under an atmosphere of high relative humidity or under damp storage conditions, whereas treatments, such as coatings to enhance paper's resistance to moisture, add cost and/or reduce its biodegradability.

Biodegradable PVA materials formed from polyvinyl alcohol resin plasticised with glycerol and water are also known. However, attempts to manufacture extruded blown PVA films have hitherto not been successful for practical purposes, in that these PVA films were found to suffer from lack of clarity or transparency, discolouration e.g. yellowing or, in extreme cases, browning, and, in particular, high manufacturing cost. A further disadvantage of these films is that residual methanol originally present in the PVA raw material is generally still present in the films, and this is undesirable for health and safety reasons due to the toxic nature of methanol.

It would therefore be desirable to provide an improved biodegradable PVA film, that is useful in practice as an environmentally friendly packaging material, for example as carrier or refuse bags, and that eliminates or reduces the problems associated with the PVA films known in the art.

We have now found that it is possible to provide biodegradable PVA films that meet the requirements for practical use as packaging material, in terms of production cost, mechanical strength properties, biodegradability, elimination of residual methanol, and aesthetic characteristics such as lack of discolouration and improved clarity. This has been achieved by providing a plasticised particulate PVA composition in accordance with the present invention, that is useful for producing PVA films.

Accordingly, in one aspect of the present invention, method of preparing a plasticised particulate PVA composition comprising:

mixing, in a mixer, at a mixer speed and for a time sufficient that the mixture attains a temperature of at least 50° C.:

particulate PVA resin in an amount from 80% to 90% by weight of the mixture; and plasticiser in an amount from 10% to 20% by weight of the mixture, wherein at least a portion of the plasticiser is water;

monitoring the apparent viscosity of the mixture during mixing and continuing mixing until the apparent viscosity of the mixture has peaked to a maximum and dropped off to a substantially constant level, thereby to obtain a plasticised particulate mixture having a moisture content in the range from 7% to 14%; and stopping mixing, and removing the mixture from the mixer, wherein the mixture temperature is kept below 100° C. at all times during mixing.

In second aspect of the present invention, a plasticised particulate PVA composition as produced by the above method is provided.

The plasticised PVA particles thus obtained are suitable for blowing to a film that is biodegradable whilst exhibiting excellent strength and transparency characteristics. Therefore, in a third aspect of the present invention, a PVA film is provided formed from a plasticised particulate PVA composition as defined above. According to this aspect, a PVA film is provided comprising a PVA resin in an amount from 80% to 90% by weight and plasticiser in an amount from 10% to 20% by weight, characterised in that, when viewed using polarising light microscopy, it has a nonuniform structural appearance consisting of distinct short range areas, each short range area showing anisotropic orientation within its area (as evidenced by a uniform colour when viewed using polarising light microscopy), each short range area being oriented isotropically (as evidenced by different areas having different colours when viewed using polarising light microscopy).

The PVA resin preferably has a mol % hydrolysis figure of 74 to 94, and may be selected according to the end product desired. For a cold water soluble product, a mol % hydrolysis figure of 80 to 90 is preferred, whilst for a hot water soluble and compostable product, a mol % hydrolysis figure of 98 to 100, e.g. about 99, is preferred. Preferably, the PVA resin is chosen to be hot water soluble and compostable. It may be desirable to blend two or more polyvinyl alcohol compositions to obtain the correct properties, for example a product with a mol % hydrolysis value of 98 and a viscosity of 56 mPa·s and a product with a mol % hydrolysis value of 99 and a viscosity of 28 mPa·s.

The PVA resin is preferably present in the particulate PVA composition in an amount from 80% to 90%, more preferably from 82% to 86%, by weight of the composition. The PVA resin component may include up to 5% of water, by weight of the PVA resin component.

The number average particle size of the PVA resin is suitably in the range from 0.5 mm to 1.0 mm, distributed for example over a range with a minimum particle size of 0.1 mm and maximum particle size 2 mm.

Suitable PVA resin materials, of various grades and degrees of hydrolysis, are known and available from commercial suppliers, and include those sold under trade names Gohsenol® (ex Nippon Gohsei), Poval® (ex Kuraray), and Celvol® (ex Celanese).

The plasticiser is present in the particulate PVA composition in order to plasticise the PVA resin particles. The plasticiser comprises at least water, and preferably further comprises one or more other plasticising compounds. The plasticiser is preferably formed of water and one or more di-, tri- and poly-hydric alcohols, esters, ethers and alkylamines having a chain length of 3 to 14 carbon or hetero atoms (excluding —OH groups) in the longest chain. More preferably, the plasticiser is a mixture of water and one or more of glycerol, ethylene glycol, diethylene glycol, triethylene glycol, polyethylene glycol having an average molecular weight of less than 200, trimethylol propane, neopentyl glycol and triethanolamine. Most preferably, the plasticiser consists of water and glycerol.

Water constitutes preferably 25% to 100%, more preferably 40% to 60%, by weight of the plasticiser. In a preferred embodiment, the plasticiser consists of water in an amount from 25% to 62.5% and glycerol in an amount from 37.5% to 75% by weight of the plasticiser.

In the preferred case that the plasticiser consists of water and glycerol, we prefer that the glycerol is present in an amount from 6% to 12%, preferably from 8% to 9%, by weight of the composition before plasticisation, and that the water is present in an amount from 4% to 10%, preferably from 5% to 10%, by weight of the composition. The weight ratio of glycerol to water is preferably in the range from 0.8:1 to 2:1, more preferably in the range from 1.3:1 to 1.7:1.

If the total amount of plasticiser is below 10%, films produced from the composition may not be sufficiently plasticised, and thus will tend to be brittle, difficult to process, and suffer from lack of clarity and discolouration.

If the amount of plasticiser is above 20%, the films tend to be tacky and may stick to each other ('blocking'), or the plasticiser may be leached or migrate out of the film. If water is present in excessive amount, bubbles may appear in the film ('fish-eye' defects) due to boiling of the water during extrusion.

The amount of water included in mixture of PVA and plasticiser is controlled to provide a moisture content in the plasticised particulate composition in the range from 7% to 14%, for example in the range from 7% to 11%. It will be appreciated that the PVA resin, as supplied, may already contain small amounts of water, for example up to 5 weight % of the resin, which can contribute to plasticisation. Thus, the amount of water included as added plasticiser in the mixture should be adjusted accordingly to take account of the water content in the raw PVA resin, so as to provide a moisture content in the plasticised particulate composition in the range from 7% to 14%, for example in the range from 7% to 11%.

Accordingly, in another aspect, a plasticised particulate PVA composition is provided, comprising particulate PVA resin in an amount from 80% to 90% by weight; glycerol in an amount from 6% to 12% by weight; water in an amount from 4% to 10% by weight; and an anti-caking agent in an amount from 0.05% to 0.5% by weight, wherein the moisture content of the plasticised particulate PVA composition is in the range from 7% to 14%, for example in the range from 7% to 11%.

Preferably, the method according to the invention further comprises adding an anti-caking agent to the plasticised mixture, when the apparent viscosity of the mixture has begun to drop off from its maximum. Mixing is then continued until the anti-caking agent is blended to the plasticised particulate mixture. The anti-caking agent is preferably added so that it is present in the particulate PVA composition in an amount from 0.05% to 0.5%, more preferably from 0.1% to 0.3%, by weight of the plasticised composition. Preferably, fumed silica is used as the anti-caking agent. Suitable fumed silica is available as Aerosil® R972 (ex Degussa). If no anti-caking agent is added, or if the amount of fumed silica is below 0.05%, this may tend to lead to caking, whilst no significant benefits are obtained by increasing the amount of fumed silica above 0.5%.

If desired, colouring or opacifying agents, or the like, may optionally be included in the composition, preferably after plasticising of the composition. These may be included in total amounts of, for example, 1 to 3% by weight of the plasticised composition. Preferably, no colouring or opacifying agents are present in the composition, in order to ensure a clear, transparent film after processing.

During mixing of the PVA resin, plasticiser and, if added, fumed silica, the mixture temperature should be kept below 100° C., preferably below 90° C., at all times. This is to prevent boiling off of any water present in the plasticiser, and to prevent the PVA dissolving in the water with consequent coagulation or caking of the PVA particles to lumps on cooling.

Surprisingly, effective plasticisation can be achieved at temperatures below 100° C., even at temperatures as low as 60° C., for example at temperatures in the range from 70° C. to 90° C. Importantly, the completion of the plasticising stage can be determined by monitoring the apparent viscosity of the mixture during mixing, for example by tracking the motor load of the mixer. By 'apparent viscosity' is meant the resistance to shear mixing provided by the particulate mixture. As the mixture is worked in the mixer, through friction and shear, its temperature increases, and a suitable mixing speed and time should be selected to ensure that the mixture reaches a temperature of at least 50° C., more preferably at least 60° C., to facilitate plasticisation. The plasticisation phase is manifested, during mixing, by a gradual increase in the apparent viscosity of the mixture, to a maximum apparent viscosity, followed by a rapid drop-off to a constant level. Throughout the plasticisation phase, the mixture temperature continues to rise. Following the apparent viscosity drop-off, further mixing does not cause significant further changes in the apparent viscosity of the plasticised mixture, although the mixture temperature would continue to rise through friction and shear mixing. The changes in apparent viscosity are accompanied by a corresponding increase and decrease in mixture volume. Typically, the plasticisation phase occurs over a period of 5 to 10 minutes, based on a 70 kg batch mixed at the high speed setting of a two-speed Baker Perkins Hydisperser® mixer, and can be observed by an increase in motor load from an original current load of about 25 A to a maximum of over 40 A, and drop-off to about 30 A.

Preferably, at approximately the point when the apparent viscosity is dropping off towards a constant level, at which point plasticisation is optimal, an anti-caking agent such as fumed silica is added and blended. Preferably, the anti-caking agent is added after, and preferably as soon as possible after, the apparent viscosity has begun to drop off from the maximum apparent viscosity level. In one embodiment, the fumed silica is added to the mixer when the plasticised mixture has attained a temperature in the range from 70° C. to 75° C. When, and preferably as soon as possible after, the anti-caking agent has been blended sufficiently to prevent caking of the plasticised particles, the mixing is stopped and the blend is removed from the mixer.

Further mixing and blending after the plasticisation phase is possible, but less desirable, and always provided that the mixture temperature is kept below 100° C.

It is preferred to chill or cool the plasticised particulate mixture, or allow the mixture to cool, and store it before passing it to the extruder. Typically, a temperature of 5° C. to 35° C., e.g. about 20° C. is suitable.

If desired, after cooling, the plasticised particulate composition may be tumbled in order to disperse any moisture that might have accumulated due to the hydrophilic nature of the PVA, and/or sieved to remove any clumps.

The properties of the plasticised particulate composition produced by the method according to the invention are such that it can be processed, by extrusion and blowing, to a film having advantageous characteristics in terms of structure and properties.

For further processing to a film, the plasticised particulate composition may be extruded through a die, and blown, using conventional apparatus. For example, extrusion can take place in a general purpose screw extruder having controlled zonal heating to give a temperature profile along the barrel. A typical example of such an extruder is a standard commercially available 38 mm Betol extruder, ex Betol, Luton, England. A typical apparatus has a 2:1 compression and should preferably be operated at maximum screw speed. The die may be of any appropriate geometry for a film shape and thickness.

Preferably, the plasticised composition is processed through the extruder at a temperature sufficient to oxidise residual methanol that may be present in the PVA resin starting material, for example at a temperature, in one or several of the extruder zones, of at least 185° C., preferably at least 190° C., and more preferably at least 195° C., but preferably not exceeding 210° C.

In a preferred embodiment, the temperature profile is for the barrel to have four zones in sequence running at about 100° C., about 175° C., about 190° C. and about 195° C., leading to an adapter also running at about 195° C. leading to the die operated at typically 185° C. to 195° C.

The PVA film comprises PVA resin in an amount from 80% to 90% by weight and plasticiser in an amount from 10% to 20% by weight, and exhibits characteristic features when viewed using polarising light microscopy. In particular, it has a regular nonuniform texture, in that the appearance is of a mesh or web-like, speckled, grainy or mottled structure, and is therefore not uniformly smooth. This structural appearance is regular across the extent of the film. The nonuniform texture consists of distinct short range areas, as evidenced by different colours when viewed using polarising light microscopy, corresponding to different short range areas. The short range areas are typically 10 to 500 micrometers in length and width. Each short range area shows anisotropic orientation within its area, as evidenced by a uniform colour within a particular short range area, when viewed using polarising light microscopy. Each short range area is oriented isotropically with respect to the other short range areas, as evidenced by different areas having different colours when viewed using polarising light microscopy. When a sample of the film is viewed under rotation, using polarising light microscopy, each short range area changes colour uniformly according to the angle of rotation, thereby indicating anisotropy in the structure within each area. However, colour change across the film is nonuniform, and instead is patchy corresponding to the short range areas. The overall colour averaged across the film also changes with angle of rotation, indicating a more long-range anisotropy in the structure of the film which might be due to directional stresses imparted to the film during extrusion.

The distinctive regular, nonuniform textured structure of the film, consisting of isotropically oriented short range areas of anisotropic structure, imparts surprising strength, transparency and other properties to the film.

The film can be used for all the purposes where polyethylene film is typically useful but possesses the following distinct advantages compared with polyethylene film:
1. The material is anti-static.
2. It has a higher strength and puncture resistance.
3. The material has a much lower fire risk, being less inflammable and producing less toxic fumes when burnt.
4. The material is totally compostable, hot water soluble or cold water soluble as required, and recyclable via aqueous solution for other applications.

The invention will be further illustrated by the following non-limiting examples:

EXAMPLES

Example 1

Preparation of Particulate PVA Compositions:

Composition 1:

Materials:
60 kg PVA resin (Gohsenol® N-300 (fully hydrolysed))
6 kg Glycerol
4 kg Water
100 g Fumed silica (Aerosil®R972, ex Degussa)

The dry powder PVA resin material at ambient temperature and a plasticiser premixture of the glycerol and water were introduced in bulk into a two-speed Baker Perkins Hydisperser® high shear mixer that had been preheated to 75° C. and switched to the lower speed setting. The mixture was blended at the lower speed setting, without imparting significant shear, for 5 minutes before switching the mixer to the higher speed setting.

Mixing was continued, for about a further 10 minutes, until the motor load of the mixer, corresponding to apparent mixture viscosity, had peaked to a maximum and dropped off to a constant level. At this point, the mixture temperature was approximately 73° C. The fumed silica was added and blended for about a further 1 minute. As soon as the fumed silica was sufficiently blended, mixing was stopped and the plasticised mixture was removed from the mixer, having attained a temperature of about 78° C.

The motor load and temperature profiles against time, from initial addition of PVA resin and plasticiser premix to the mixer, were monitored and recorded as shown in Table 1:

TABLE 1

| | Time (min) | | | | | | | | |
|---|---|---|---|---|---|---|---|---|---|
| | 0 | 5 | 11 | 12 | 14 | 14.5 | 15 | 16 | 17 | 19 |
| Temp (° C.) | 25 | 36 | 52 | 56 | 66 | 68 | 71 | 73 | 77 | 78 |
| Load (A) | 21 | 21 | 25 | 27 | 35 | 42 | 36 | 32 | 32 | 32 |

The plasticised powder mixture was allowed to cool overnight, to ambient temperature, briefly tumbled in a tumble mixer to disperse any accumulated moisture, and sieved to remove any clumps.

A white particulate plasticised PVA composition was obtained ("Composition 1"), having a moisture content of 9.8% and number average particle size of 0.8 mm.

Composition 2:

Materials:
60 kg PVA resin (Poval® 117H)
6 kg Glycerol
4 kg Water
100 g Fumed silica (Aerosil® R972, ex Degussa)

The materials were mixed in the same manner as described for Composition 1. A white particulate plasticised PVA composition was obtained ("Composition 2"), having a moisture content of 10.0%.

Composition 3:

Materials:
60 kg PVA resin (Celvol® 125)
6 kg Glycerol
7 kg Water
100 g Fumed silica (Aerosil® R972, ex Degussa)

The materials were mixed in the same manner as described for Composition 1. A white particulate plasticised PVA composition was obtained ("Composition 3"), having a moisture content of 13.0%.

Composition 4:

Materials:
60 kg PVA resin (Celvol® 325)
6 kg Glycerol
5 kg Water
100 g Fumed silica (Aerosil® R972, ex Degussa)

The materials were mixed in the same manner as described for Composition 1. A white particulate plasticised PVA composition was obtained ("Composition 4"), having a moisture content of 12.5%.

Composition 5:

Materials:
60 kg PVA resin (Poval® 117)
6 kg Diethylene glycol
4 kg Water
100 g Fumed silica (Aerosil® R972, ex Degussa)

The materials were mixed in the same manner as described for Composition 1. A white particulate plasticised PVA composition was obtained ("Composition 5"), having a moisture content of 13.0%

Composition 6:

Materials:
60 kg PVA resin (Poval® 117H)
10 kg Water
100 g Fumed silica (Aerosil® R972, ex Degussa)

The materials were mixed in the same manner as described for Composition 1. A white particulate plasticised PVA composition was obtained ("Composition 6"), having a moisture content of 15.0%.

Example 2

Processing to Form Blown Films:

The particulate PVA composition of Composition 1 of Example 1 was processed to form blown films, using conventional extruder, die and blowing apparatus. The extruder (38 mm Betol general purpose screw extruder) and die temperature profile were as indicated in Table 2:

TABLE 2

| Zone 1 | Zone 2 | Zone 3 | Zone 4 | Adapter | Die |
|---|---|---|---|---|---|
| 100° C. | 175° C. | 190° C. | 195° C. | 195° C. | 195° C. |

The screw speed was set initially to 28 rpm, until the mix reached the die, then adjusted to 100 rpm.

Two PVA films were blown, and assessed against two conventional polyethylene (PE) films. Samples of the PVA films and PE films were tested at 23° C. at 50% relative humidity, after having been conditioned by storage for one week at 23° C. at either 50% ("23/50") or 90% ("23/90") humidity.

Test methods were as follows:

Thickness: BS2782:6, method 630A (1994), digital deadweight micrometer, 29 mm$^2$ pressure foot area under a force of 0.85N.

Impact resistance (puncture test): ASTM D1709-91, specimens clamped in annular holder, darts with hemispherical heads loaded with weights were dropped from set distance 66 cm onto centre of clamped specimen, impact resistance taken as the mass in grams of the dart expected to break half of a number of test pieces.

Tensile strength: BS2782:3, method 326C 1977(1983), Hounsfield tensile tester with internal extensometer, 15 mm wide test pieces, initial jaw separation 50 mm, 500 mm/min test speed, 50 N load cell.

Internal tear resistance: BS EN 21974(1994)/ISO 1974 (1990), digital single tear tester, single ply test pieces.

The results are shown in Tables 3 to 7 below:

TABLE 3

| Film | Thickness (μm) | | | Impact resistance (g) | |
|---|---|---|---|---|---|
| Conditioning | — | 23/50 | 23/90 | 23/50 | 23/90 |
| PVA film 1 | 25 | 26 | 29 | 355 | 675 |
| PVA film 2 | 40 | 41 | 44 | 775 | 1100 |
| PE film 1 | 62 | 83 | 83 | 400 | 340 |
| PE film 2 | 100 | 109 | 106 | 380 | 380 |

TABLE 4

| | Yield strength | | | |
|---|---|---|---|---|
| | Machine direction | | Cross direction | |
| Film | | | | |
| Conditioning | 23/50 | 23/90 | 23/50 | 23/90 |
| PVA film 1 | 23 | 12 | 25 | 8 |
| PVA film 2 | 21 | 7 | 25 | 12 |
| PE film 1 | 11 | 11 | 10 | 10 |
| PE film 2 | 11 | 13 | 11 | 13 |

TABLE 5

| | Ultimate tensile strength | | | |
|---|---|---|---|---|
| | Machine direction | | Cross direction | |
| Film | | | | |
| Conditioning | 23/50 | 23/90 | 23/50 | 23/90 |
| PVA film 1 | 68 | 49 | 57 | 50 |
| PVA film 2 | 64 | 27 | 66 | 38 |
| PE film 1 | 23 | 22 | 21 | 20 |
| PE film 2 | 23 | 26 | 26 | 25 |

TABLE 6

| | Elongation | | | |
| Film | Machine direction | | Cross direction | |
| Conditioning | 23/50 | 23/90 | 23/50 | 23/90 |
| PVA film 1 | 98 | 132 | 228 | 331 |
| PVA film 2 | 178 | 190 | 256 | 353 |
| PE film 1 | 539 | 743 | 729 | 802 |
| PE film 2 | 698 | 867 | 893 | 774 |

TABLE 7

| | Internal Tear Resistance | | | |
| Film | Machine direction | | Cross direction | |
| Conditioning | 23/50 | 23/90 | 23/50 | 23/90 |
| PVA film 1 | 611 | 856 | 2449 | 3277 |
| PVA film 2 | 4445 | 5276 | 9094 | 5850 |
| PE film 1 | 1718 | 1500 | 3261 | 3082 |
| PE film 2 | 2585 | 2710 | 2614 | 4143 |

The results show that PVA films in accordance with the invention exhibited superior tensile strength and puncture resistance to the PE films, despite PE films 1 & 2 being two and a half times as thick as PVA films 1 & 2, respectively.

Further, by visual assessment PVA films 1 & 2 exhibited improved clarity and lack of discolouration compared with PE films 1 & 2. In addition, the PVA films contained no residual methanol.

Example 3

PVA films were blown from particulate plasticised Compositions 2 to 6 of Example 1, using conventional extruder, die and blowing apparatus, in the same manner as described for Example 2.

Acceptable films were obtained from Compositions 1 to 5. The film from Composition 6 contained bubbles.

When viewed statically using polarising light microscopy, the films from Compositions 1 to 4 appeared as a mesh-like texture of different colour patches. When viewed under rotation, using polarising light microscopy, the appearance of the films changed colour nonuniformly with angle of rotation.

Example 4

PVA films were blown from particulate PVA composition of Composition 1 of Example 1, using conventional extruder, die and blowing apparatus, in the same manner as described for Example 2. The films thus prepared ("PVA film 3") were assessed against two conventional PVA films ("Aquafilm"—Pink Laundry Bag; "PVAXX"—Non-coloured Bag). Samples of the PVA films, each 30 µm in thickness, were tested at 23° C. at 50% relative humidity, after having been conditioned by storage for one week at 23° C. at 50% relative humidity for at least 16 hours.

Test methods were as follows:
Tensile strength: BS2782:3, method 326C 1977(1983), Hounsfield tensile tester, 15 mm wide test pieces, initial jaw separation 100 mm, 500 mm/min test speed, 50 N load cell, 10 replicate tests per direction (machine direction MD, cross direction CD).

TABLE 8

| | Tensile strength and stretch | | |
| Sample | Direction | Strength (N/mm$^2$) Mean | Elongation (%) Mean |
| Aquafilm | MD | 62 | 111 |
| | CD | 58 | 189 |
| PVAXX | MD | 45 | 223 |
| | CD | 38 | 266 |
| PVA film 3 | MD | 69 | 141 |
| | CD | 61 | 167 |

The PVA film 3 showed increased strength in both machine and cross directions, compared with the Aquafilm and PVAXX films.

When viewed statically using polarising light microscopy, the Aquafilm and PVAXX films appeared smooth and essentially uniform in colour. The PVA film 3 appeared as a mesh-like structure of different colour patches.

When viewed under rotation, using polarising light microscopy, the appearance of the Aquafilm and PVAXX films changed colour uniformly with angle of rotation. The appearance of the PVA film 3 changed colour nonuniformly on rotation.

The invention claimed Is:

1. A method for preparing a plasticized particulate polyvinyl alcohol (PVA) composition comprising:
    mixing, in a mixer, a particulate PVA resin, in an amount from 80% to 90% by weight of the mixture; and plasticizer, in an amount from 10% to 20% by weight of the mixture, wherein at least a portion of the plasticizer is water;
    monitoring the apparent viscosity of the mixture during mixing; and continuing mixing until the apparent viscosity of the mixture has peaked to a maximum and dropped off to a substantially constant level, to obtain a plasticised particulate mixture having a moisture content in the range from 7% to 14%; and
    stopping mixing, and removing the mixture from the mixer,
    wherein the mixing is at a speed and for a time sufficient that the mixture attains a temperature of at least 50° C.; and
    wherein the mixture temperature is kept below 100° C. at all times during mixing.

2. The method of claim 1 wherein the plasticizer comprises a mixture of water and a plasticizing compound selected from the group consisting of di-, tri- and polyhydric alcohols, esters, ethers and alkylamines having a chain length of 3 to 14 carbon atoms or hetero atoms (excluding —OH groups) in the longest chain, and mixtures thereof.

3. The method of claim 1 wherein the plasticizer comprises a mixture of water and a plasticizing compound selected from the group consisting of glycerol, ethylene glycol, diethylene glycol, triethylene glycol, polyethylene glycol having an average molecular weight less than 200, trimethylol propane, neopentyl glycol, triethanolamine, and mixtures thereof.

4. The method of claim 1 wherein the plasticizer comprises from 25% to 100% water, by weight.

5. The method of claim 1 wherein the plasticizer comprises from 40% to 60% water, by weight.

6. The method of claim 1 wherein the plasticizer comprises water and glycerol.

7. The method of claim 1 wherein the plasticizer comprises from 25% to 62.5% water and from 37.5% to 75% glycerol, by weight.

8. The method of claim 2, wherein the plasticizer is premixed to form a premixture, before adding to the mixer.

9. The method of claim 8, wherein the premixture is added to the mixer as a spray.

10. The method of claim 8, wherein the premixture is added to the mixer in bulk together with the particulate PVA resin.

11. The method of claim 1, further comprising adding an anti-caking agent in an amount from 0.05% to 0.5% by weight of the plasticised particulate mixture when the apparent viscosity of the mixture has begun to drop off from its maximum, and continuing mixing until the anti-caking agent is blended to the plasticised particulate mixture.

12. The method of claim 11, wherein the anti-caking agent is fumed silica.

13. The method of claim 11, wherein the anti-caking agent is added to the mixer when the mixture has attained a temperature in the range from 70° C. to 75° C.

14. The method of claim 1 wherein the mixture is removed from the mixer on attaining a temperature of about 80° C.

15. The method of claim 1 wherein the particulate PVA resin has a number average particle size in the range from 0.5 mm to 1.0 mm.

16. The method of claim 1 wherein the mixture temperature is kept below 90° C. at all times during mixing.

17. The method of claim 1 wherein the moisture content of the plasticised particulate PVA composition is in the range from 7% to 11%.

18. The method of claim 1 wherein the mixture consists of essentially of:
  particulate PVA resin in an amount from 82% to 86% by weight;
  glycerol in an amount from 8% to 9% by weight; and
  water in an amount from 5% to 10% by weight,
  and fumed silica is added as anti-caking agent after plasticization plasticisation in an amount from 0.1% to 0.2% by weight.

19. A plasticized particulate PVA composition produced by the method of claim 1.

20. A plasticized particulate PVA composition comprising particulate PVA resin in an amount from 80% to 90% by weight; glycerol in an amount from 6% to 12% by weight; water in an amount from 4% to 10% by weight; and an anti-caking agent in an amount from 0.05% to 0.5% by weight, wherein the moisture content of the plasticized particulate PVA composition is in the range from 7% to 14%.

21. The method of claim 1, further comprising processing the plasticized particulate PVA composition to form a film.

22. The method of claim 21, wherein the processing of the plasticized particulate PVA composition is through a temperature zone of at least 185° C.

* * * * *

UNITED STATES PATENT AND TRADEMARK OFFICE
CERTIFICATE OF CORRECTION

| | | |
|---|---|---|
| PATENT NO. | : 7,217,385 B2 | Page 1 of 1 |
| APPLICATION NO. | : 11/128683 | |
| DATED | : May 15, 2007 | |
| INVENTOR(S) | : Taylor et al. | |

It is certified that error appears in the above-identified patent and that said Letters Patent is hereby corrected as shown below:

In column 12, line 12 (Approx.), in Claim 18, after "plasticization" delete "plasticisation".

Signed and Sealed this

Thirty-first Day of July, 2007

JON W. DUDAS
*Director of the United States Patent and Trademark Office*